(12) United States Patent
Rock (10) Patent No.: US 11,065,623 B1
(45) Date of Patent: Jul. 20, 2021

(54) GRINDING BLADE FOR AN ANGLE GRINDER

(71) Applicant: Stephen Rock, Phoenix, AZ (US)

(72) Inventor: Stephen Rock, Phoenix, AZ (US)

(*) Notice: Subject to any disclaimer, the term of this patent is extended or adjusted under 35 U.S.C. 154(b) by 329 days.

(21) Appl. No.: 15/994,508

(22) Filed: May 31, 2018

Related U.S. Application Data (60) Provisional application No. 62/513,164, filed on May 31, 2017.

(51) Int. Cl.
*B02C 18/18* (2006.01)
*B02C 18/16* (2006.01)
*A01G 23/06* (2006.01)

(52) U.S. Cl.
CPC ............ *B02C 18/18* (2013.01); *A01G 23/067* (2013.01); *B02C 2018/164* (2013.01)

(58) Field of Classification Search
CPC ...... A01G 23/067; A01G 23/06; B02C 18/18; B02C 18/182; B02C 18/184; B02C 18/083; B02C 18/143; B27G 13/00; B27G 13/08; B27G 13/10; B23C 5/08; B23C 5/006; B27L 11/00; B27L 11/02; B27L 11/06; B27L 11/08; B23B 2251/50; B23B 2251/505; B23B 2251/56; B23B 2229/04; B23B 49/003; B23B 49/005; B23B 49/006; B23B 49/008
USPC ....................................... 144/24.12
See application file for complete search history.

(56) References Cited

U.S. PATENT DOCUMENTS

| | | | | |
|---|---|---|---|---|
| 4,850,407 A | * | 7/1989 | Inkster | B27C 1/005 144/240 |
| 5,269,355 A | * | 12/1993 | Bowen | A01G 23/067 144/218 |
| 5,947,805 A | * | 9/1999 | Van Osenbruggen | B24D 7/18 451/358 |
| 6,024,143 A | | 2/2000 | Ritchey | |
| 6,033,159 A | * | 3/2000 | Kress | B23D 77/02 408/199 |
| 6,484,766 B1 | * | 11/2002 | Falatok | A01G 23/067 144/218 |

(Continued)

OTHER PUBLICATIONS

"Stump removal alternatives? Power tool attachments??" http://www.doityourself.com/forum/gardening-horticulture/481501-stump-removal-alternatives-power-tool-attachments.html, published Nov. 5, 2012.

*Primary Examiner* — Shelley M Self
*Assistant Examiner* — Jared O Brown
(74) *Attorney, Agent, or Firm* — Booth Udall Fuller, PLC; Pacer K. Udall (57) ABSTRACT

A grinding blade having a blade body, a plurality of tooth mounts, a plurality of cutting teeth, and a plurality of blade stops is disclosed. The blade body has a front surface, a back surface, and a blade mounting hole along a central axis. The tooth mounts and blade stops are integral with the blade body and protrude upward and away from the back surface and the central axis. Each tooth mount has a cutting tooth releasably coupled through a tooth aperture. The blade stops and tooth mounts are equal in number and are distributed alternatingly and with radial symmetry about the central axis. A cross section of the solid of revolution defined by rotating the blade stops about the central axis overlaps with at least two thirds of a cross section of the solid of revolution defined by rotating the cutting teeth about the central axis.

18 Claims, 9 Drawing Sheets

(56) References Cited

U.S. PATENT DOCUMENTS

| | | | |
|---|---|---|---|
| 6,691,596 B1* | 2/2004 | Singh | B23D 61/021 |
| | | | 83/13 |
| 2005/0164620 A1* | 7/2005 | Amamoto | B23C 5/006 |
| | | | 451/548 |
| 2008/0149224 A1 | 6/2008 | Kappel et al. | |
| 2009/0026296 A1 | 1/2009 | Isley et al. | |
| 2010/0180735 A1 | 7/2010 | MacLennan et al. | |
| 2010/0218851 A1* | 9/2010 | Leonardi | A01G 23/067 |
| | | | 144/235 |
| 2010/0313998 A1 | 12/2010 | Lebreux | |
| 2011/0182677 A1* | 7/2011 | Frank | B23C 5/006 |
| | | | 407/46 |
| 2013/0125724 A1 | 5/2013 | MacLennan et al. | |
| 2014/0196818 A1 | 7/2014 | Weinberg et al. | |
| 2014/0196819 A1 | 7/2014 | Leonardi et al. | |
| 2014/0338791 A1 | 11/2014 | Green et al. | |
| 2015/0136276 A1* | 5/2015 | Green | A01G 23/067 |
| | | | 144/24.12 |
| 2016/0135388 A1 | 5/2016 | Leonardi et al. | |

* cited by examiner

GRINDING BLADE FOR AN ANGLE GRINDER

RELATED APPLICATIONS

This application claims the benefit of U.S. provisional patent application 62/513,164 filed May 31, 2017 titled "Grinding Blade for an Angle Grinder," the entirety of the disclosure of which is hereby incorporated by this reference.

TECHNICAL FIELD

Aspects of this document relate generally to a grinding blade for an angle grinder.

BACKGROUND

Conventional stump grinding machines are typically large and expensive. While conventional machines can be effective in removing stumps, their size can prevent their use against smaller stumps and roots, particularly when located near other objects. Conventional stump grinders can range in size between a lawn mower or as large as truck, making them unwieldy. Some may require more than one person to use (i.e. to lift onto or off of a truck before and after use, etc.). Furthermore, due to their size, the movements of conventional stump grinders often need to be assisted by hydraulic actuators. This assistance comes at the cost of limiting the range and nature of movement of the cutting blade.

The use of conventional stump grinding blades in a smaller, handheld machine can be dangerous. Handheld tools lack the weight and stability of the conventional machines, and when the conventional blade engages with the target material, the bite will likely jerk the tool out of the users control in a dangerous manner.

SUMMARY

According to one aspect, a grinding blade includes a blade body having a front surface, a back surface opposite and below the front surface, and a blade mounting hole passing through the front surface and the back surface along a central axis. The blade body further includes an edge surface joining the front surface and the back surface distal to the central axis. The blade mounting hole is sized and shaped for mounting to a powered tool. The grinding blade further includes a plurality of tooth mounts integral with the blade body and protruding upward and away from the back surface and away from the central axis. Each tooth mount includes a tooth aperture proximate a distal end of the tooth mount and substantially perpendicular to the central axis. The grinding blade also includes a plurality of blade stops integral with the blade body and protruding upward and away from the back surface and away from the central axis. The blade stops and tooth mounts are equal in number and distributed in alternating fashion proximate the edge surface such that the plurality of tooth mounts has radial symmetry with respect to the central axis and the plurality of blade stops has radial symmetry with respect to the central axis. Additionally, the grinding blade includes a plurality of cutting teeth, each cutting tooth of the plurality of cutting teeth releasably coupled to a different tooth aperture and comprising a cutting head on a leading side of the tooth mount, and a releasable fastener on a trailing side of the tooth mount. The releasable fastener is coupled to the cutting head by a tooth shank integral with the cutting head and passing through the tooth aperture. A maximum mount radius is a greatest perpendicular distance between the central axis and a point on one of the plurality of tooth mounts. A maximum stop radius is a greatest perpendicular distance between the central axis and a point on one of the plurality of blade stops. A maximum body radius is a greatest perpendicular distance between the central axis and a point on the edge surface. The maximum mount radius is greater than the maximum stop radius, and the maximum stop radius is greater than the maximum body radius. A back plane is a plane normal to the central axis and containing a majority of the back surface of the blade body. A maximum mount elevation is a greatest normal distance between the back plane and a point on one of the plurality of tooth mounts. A maximum stop elevation is a greatest normal distance between the back plane and a point on one of the plurality of blade stops. A maximum body elevation is a greatest normal distance between the back plane and a point on the edge surface. The maximum mount elevation is greater than the maximum stop elevation, and the maximum stop elevation is greater than the maximum body elevation. Lastly, a cross section of the solid of revolution defined by rotating the plurality of blade stops about the central axis overlaps with at least two thirds of a cross section of the solid of revolution defined by rotating the cutting heads of the plurality of cutting teeth about the central axis.

Particular implementations may comprise one or more of the following features. A maximum blade radius may be a greatest perpendicular distance between the central axis and a point on one of the plurality of teeth, and may be no greater than 4.5 inches. Each blade stop may comprise two facial surfaces each facing away from at least one of the back surface and the central axis. The maximum stop elevation may occur on at least a point on each blade stop. The point may be on an edge formed by the intersection of the two facial surfaces. Each of the two facial surfaces may slope downward from the point. A majority of the back surface of the blade body may be planar. The plurality of cutting teeth may all be entirely above the back surface. Finally, the plurality of blade stops may be four blade stops, and the plurality of tooth mounts may be four tooth mounts.

According to another aspect of the disclosure, a grinding blade includes a blade body having a front surface, a back surface opposite and below the front surface, and a blade mounting hole passing through the front surface and the back surface along a central axis. The blade body further includes an edge surface joining the front surface and the back surface distal to the central axis. The blade mounting hole is sized and shaped for mounting to a powered tool. The grinding blade also includes a plurality of tooth mounts integral with and protruding from the blade body, each tooth mount comprising a tooth aperture proximate a distal end of the tooth mount and substantially perpendicular to the central axis. The grinding blade further includes a plurality of blade stops integral with and protruding from the blade body. The blade stops and tooth mounts are equal in number and distributed in alternating fashion proximate the edge surface such that the plurality of tooth mounts has radial symmetry with respect to the central axis and the plurality of blade stops has radial symmetry with respect to the central axis. The grinding blade also includes a plurality of cutting teeth. Each cutting tooth of the plurality of cutting teeth is releasably coupled to a different tooth aperture and comprises a cutting head on a leading side of the tooth mount, and a releasable fastener on a trailing side of the tooth mount. The releasable fastener is coupled to the cutting head by a tooth shank integral with the cutting head and passing through the tooth aperture. Lastly, the plurality of blade stops and the plurality of tooth mounts are all at least one of protruding upward and away from the back surface and protruding outward and away from the central axis.

Particular implementations may comprise one or more of the following features. A cross section of the solid of revolution defined by rotating the plurality of blade stops about the central axis may overlap with at least a majority of a cross section of the solid of revolution defined by rotating the cutting heads of the plurality of cutting teeth about the central axis. A maximum mount radius may be a greatest perpendicular distance between the central axis and a point on one of the plurality of tooth mounts. A maximum stop radius may be a greatest perpendicular distance between the central axis and a point on one of the plurality of blade stops. A maximum body radius may be a greatest perpendicular distance between the central axis and a point on the edge surface. The maximum mount radius may be greater than the maximum stop radius, and the maximum stop radius may be greater than the maximum body radius. A back plane may be a plane normal to the central axis and may contain a majority of the back surface of the blade body. A maximum mount elevation may be a greatest normal distance between the back plane and a point on one of the plurality of tooth mounts. A maximum stop elevation may be a greatest normal distance between the back plane and a point on one of the plurality of blade stops. A maximum body elevation may be a greatest normal distance between the back plane and a point on the edge surface. The maximum mount elevation may be greater than the maximum stop elevation, and the maximum stop elevation may be greater than the maximum body elevation.

According to yet another aspect of the disclosure, a grinding blade includes a blade body having a front surface, a back surface opposite and below the front surface, a blade mounting hole passing through the front surface and the back surface along a central axis, and an edge surface joining the front surface and the back surface distal to the central axis. The blade mounting hole is sized and shaped for mounting to a powered tool. The grinding blade also includes a plurality of tooth mounts integral with the blade body and at least one of protruding upward and away from the back surface and protruding away from the central axis. Each tooth mount includes a tooth aperture proximate a distal end of the tooth mount and substantially perpendicular to the central axis. Finally, the grinding blade includes a plurality of blade stops integral with the blade body and at least one of protruding upward and away from the back surface and protruding away from the central axis. The blade stops and tooth mounts are equal in number and distributed in alternating fashion proximate the edge surface.

Particular implementations may comprise one or more of the following features. The grinding blade may further include a plurality of cutting teeth. Each cutting tooth of the plurality of cutting teeth may be releasably coupled to a different tooth aperture and may comprise a cutting head on a leading side of the tooth mount, and a releasable fastener on a trailing side of the tooth mount. The releasable fastener may be coupled to the cutting head by a tooth shank integral with the cutting head and passing through the tooth aperture. Lastly, the plurality of tooth mounts may have radial symmetry with respect to the central axis, and the plurality of blade stops may have radial symmetry with respect to the central axis.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112, ¶6. Thus, the use of the words "function," "means" or "step" in the Detailed Description or Description of the Drawings or claims is not intended to somehow indicate a desire to invoke the special provisions of 35 U.S.C. § 112, ¶6, to define the invention. To the contrary, if the provisions of 35 U.S.C. § 112, ¶6 are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112, ¶6. Moreover, even if the provisions of 35 U.S.C. § 112, ¶6 are invoked to define the claimed aspects, it is intended that these aspects not be limited only to the specific structure, material or acts that are described in the preferred implementations, but in addition, include any and all structures, materials or acts that perform the claimed function as described in alternative implementations or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

Conventional stump grinding machines, as well as conventional machines meant to remove other dense materials, are typically large and unwieldy, and can be expensive. While conventional machines can be effective in removing stumps and other materials, their size can prevent their use against smaller stumps and structures, particularly when located near other objects.

Conventional stump grinders can range in size between a lawn mower or as large as truck. Some may require more than one person to use (i.e. lift onto or off of a truck before and after use, etc.). Furthermore, due to their size, the movements of conventional stump grinders must be assisted, often by hydraulic cylinders. This assistance comes at the cost of limiting the range of movement of the cutting blade.

The use of conventional stump grinding blades in a smaller, handheld machine can be dangerous. Handheld tools lack the weight and stability of the conventional machines, and when the conventional blade engages with the target material, the bite will likely jerk the tool out of the users control in a dangerous manner.

Contemplated herein is a grinding blade for use in a handheld tool, such as an angle grinder. The size, shape, and configuration of the disclosed grinding blade permits it to be used with an angle grinder. An angle grinder, when used with the contemplated grinding blade, is more maneuverable and less expensive than a conventional stump grinder, but is safer and smoother in operation than a conventional stump grinding blade sized for use in the angle grinder. The combination of cutting teeth with a series of blade stops allows for the smooth operation of the blade while minimizing the danger of plunging too deep into the target material or taking too big a bite, which could cause the tool to be jerked out of the users control. This is not a great concern in conventional stump grinders whose bulk and hydraulic assistance prevent such a loss of control, at the cost of maneuverability, expense, and adaptability. The disclosed blades can be used to safely remove roots, small stumps, palm stumps, and other dense materials, even in confined spaces that would be inaccessible to a conventional machine.

Furthermore, the disclosed blades may also be adapted for use to quickly remove other dense materials such as concrete and other construction materials. Such work with dense materials, whether for construction or demolition, is often relegated to large machinery that reduces the risk of the tool being jerked out of the control of the user(s). The various implementations of the grinding blade contemplated herein may be used in a handheld tool, such as an angle grinder, to perform jobs usually left to larger devices, and can do so in tight spaces.

It should be noted that in the following discussion, the contemplated grinding blade is intended for use with a standard angle grinder (e.g. a 9" angle grinder, etc.). However, it should be understood that the disclosed implementations of the grinding blade might be adapted for use with other tools providing powered rotation. Furthermore, while many examples may be given of applying the contemplated grinding blade to the removal of stump materials, it should be understood that implementations of the blade having cutting teeth made of an appropriate material may be used on other materials, such as construction materials, wood, stucco, asphalt, concrete, and the like.

Figure 1:
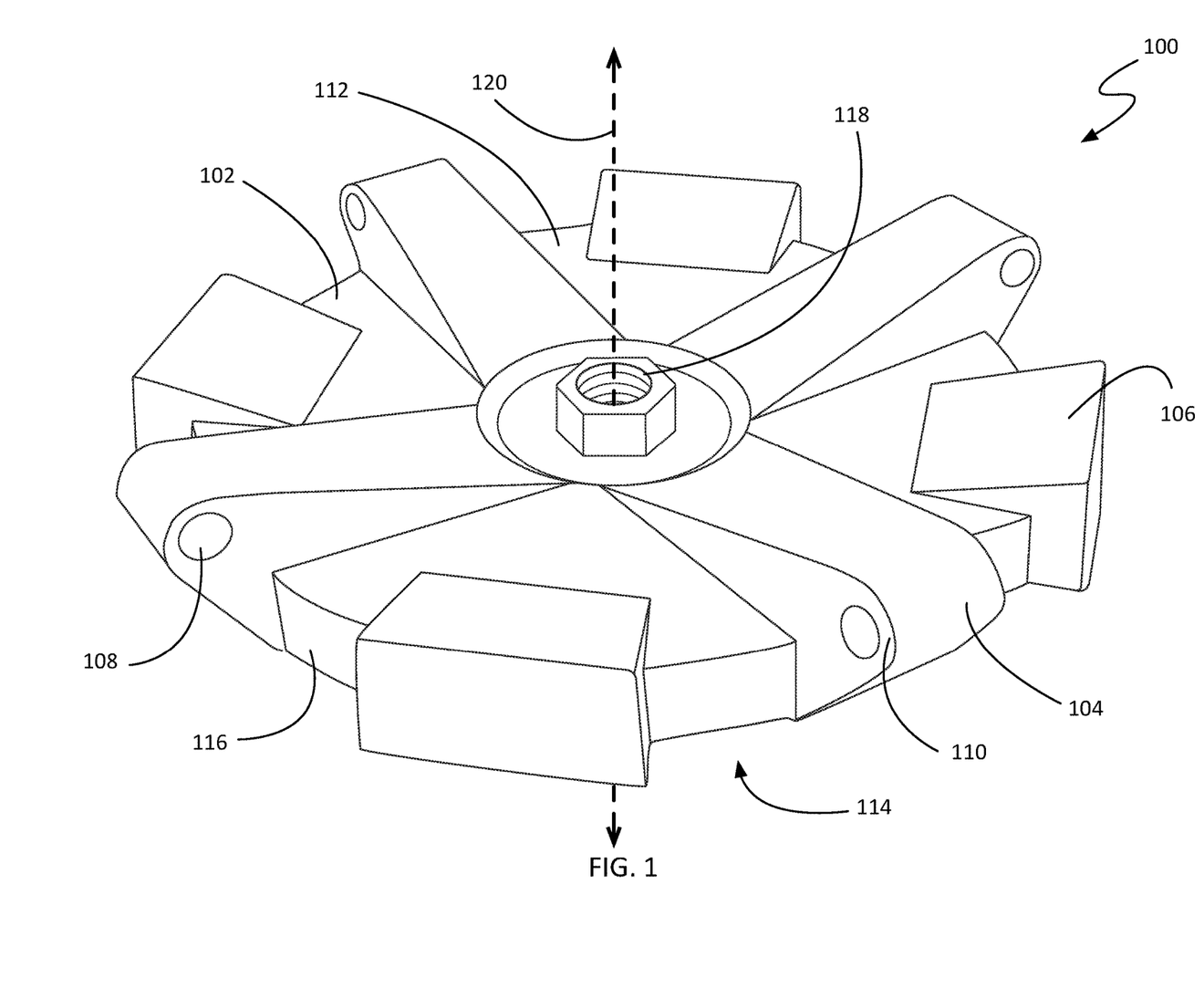
FIG. 1 is a perspective view of a grinding blade.

FIG. 1 is a perspective view of a non-limiting implementation of a grinding blade 100. As shown, the grinding blade 100 comprises a blade body 102, a plurality of tooth mounts 104 and a plurality of blade stops 106. The blade body 102 comprises a front surface 112 and a back surface 114 opposite and below the front surface 112. It should be noted that in the context of the present description and the claims that follow, relative positions will be described on the basis of the blade facing upward, such that moving along the axis on which the blade 100 rotates, from the back surface 114 to the front surface 112, is an upward direction, and the front surface 112 is above the back surface 114.

The blade body 102 further comprises an edge surface 116 that joins the front surface 112 and the back surface 114 along the outer perimeter, or distal to a central axis 120. In some implementations, the edge surface 116 may be continuous around a circumference of the blade body 102, while in other implementations, including the implementation shown in FIG. 1, the edge surface 116 may be broken up by other elements, such as the tooth mounts 104 and blade stops 106, which may be integral with the blade body 102. In such implementations, the edge surface 116 may be thought of as existing in the gaps between blade stops 106 and tooth mounts 104. As a specific example, these gaps may be ½" wide. In some implementations the edge surface 116 may be flat, while in others it may be arcuate, and in still other implementations the edge surface 116 may be faceted, or have other shapes.

In some implementations, the blade body 102 may be essentially flat, while in others it may have a non-rectangular cross section (e.g. tapering cross section to reduce blade weight, etc.). In some implementations, including the non-limiting example shown in FIG. 1, the blade body 102 may be essentially circular, while in other implementations the blade body 102 may be non-circular, so long as the distribution of weight and positioning of blade stops 106 and tooth mounts 104 is such that the blade 100 may spin smoothly (e.g. an imbalanced blade may tend to wobble and jerk in operation).

The blade body 102 also comprises a blade mounting hole 118 centered on a central axis 120 and through which the blade 100 may be mounted to a powered tool such as an angle grinder. In some implementations, the blade mounting hole 118 may be threaded, as shown in FIG. 1, while in others it may be otherwise configured to couple to a powered tool using any methods known in the art. As a specific example, the blade mounting hole 118 may be a standard ⅝" arbor hole. The central axis 120 is the axis on which the blade 100 rotates when used, and is also the reference point for the various blade radii disclosed herein.

As shown, the grinding blade 100 further comprises a plurality of tooth mounts 104 and blade stops 106. In some implementations, the number of tooth mounts 104 and blade stops 106 may be equal, while in others it is not. In the non-limiting example shown in FIG. 1, the blade 100 has four blade mounts 104 and four blade stops 106.

In the context of the present description and the claims that follow, a tooth mount 104 is a structure configured to hold at least one cutting tooth. A cutting tooth is an object designed to cut into and remove material, and will be discussed in greater detail with respect to FIG. 2.

In some implementations, the cutting tooth may be integral with the tooth mount 104. In other implementations, including the non-limiting example shown in FIG. 1, the tooth mounts 104 may be configured for use with removable cutting teeth. As shown, each tooth mount 104 comprises a tooth aperture 108 that passes the mount near the distal end 110 of the tooth mount 104. In some implementations, the tooth aperture 108 may be substantially perpendicular to the central axis 120. In the context of the present description and the claims that follow, substantially perpendicular means perpendicular within 10 degrees. In other implementations, the tooth aperture 108 of each tooth mount 104 may be oriented at an angle with respect to the central axis 120, the angle chosen to optimize the operation of the cutting tooth to be installed inside the tooth aperture 108.

In some implementations, the tooth aperture 108 may have circular cross-section. In other implementations, the tooth aperture 108 may have a non-circular cross section that matches the cross section of the portion of the cutting tooth held within the aperture 108. For example, the aperture 108 may have any rectilinear or curvilinear cross-sectional shape including but not limited to circular, elliptical, semi-circular, triangular, square, hexagonal, star or eccentric.

In some implementations, the edges of each tooth aperture 108 may be chamfered, to better mate with the cutting tooth. As an option, the chamfer of the edge of the tooth aperture 108 may be asymmetrical to match a surface on the cutting tooth, such that the cutting tooth, once installed, cannot rotate within the aperture 108.

In some implementations, the tooth aperture 108 may be formed within the tooth mount 104. For example, in one implementation, the tooth aperture 108 may be drilled through the tooth mount 104. In other implementations, the aperture 108 may consist of a structure coupled to the tooth mount 104. For example, in one implementation, the tooth aperture 108 may comprise a short segment of pipe that has been attached to the blade body 102 through a piece of material, the piece of material and the pipe together forming the tooth mount 104.

As shown in FIG. 1, the tooth mounts 104 may protrude upward and outward, away from both the back surface 114 and the central axis 120. According to various implementations, the tooth mounts 104 may protrude out of the blade body 102 in an upward direction, an outward direction, or both. In some implementations, the tooth mounts 104 may be integral with the blade body 102, while in others they may be coupled to one or more surfaces of the blade body 102, such as the front surface 112 or the edge surface 116. The protrusion of the tooth mounts 104 will be discussed in greater detail with respect to FIGS. 5 and 6.

The grinding blade 100 further comprises a plurality of blade stops 106. In the context of the present description and the claims that follow, a blade stop 106 is a structure shaped and positioned with respect to the tooth mounts 104 and blade body 102 such that, in use, the blade 100 is prevented from plunging too deep into the targeted material, and to prevent the cutting teeth from getting too big a bite. In other words, the blade stops 106 prevent a portion of the cutting tooth from being exposed to the material being removed while in operation. This may serve to make the blade safer to use in a handheld tool; if the blade 100 grabs too big a bite of the material being removed, it could cause the tool to be jerked from the users hands, or may cause them to lose control, both of which can be very dangerous. Furthermore, the blade stops 106 shielding a portion of the cutting tooth surface allows the blade 100 to operate in a smooth manner. Advantageously, shielding a portion of the cutting tooth surface with the blade stops 106 allows the use of conventional cutting teeth designed for use with conventional stump grinders or other tools, whose bulk tends to negate the danger posed by taking too big a bite. The blade stops 106 allow the use of conventional cutting teeth with a grinding blade 100 designed for use with a hand held powered tool, such as an angle grinder.

As shown in FIG. 1, the blade stops 106 may protrude upward and outward, away from both the back surface 114 and the central axis 120. According to various implementations, the blade stops 106 may protrude out of the blade body 102 in an upward direction, an outward direction, or both. In some implementations, the blade stops 106 may be coupled to one or more surfaces of the blade body 102, such as the front surface 112 or the edge surface 116. As a specific example, in one implementation, the blade stops 106 may consist of angle iron that has been welded to the front surface 112 of the blade body 102. In other implementations, including the non-limiting example shown in FIG. 1, the blade stops 106 may be integral with the blade body 102. The protrusion of the blade stops 106 will be discussed in greater detail with respect to FIGS. 5 and 6.

The blades stops 106 may be shaped such that they may perform their function, as described above, without also functioning as cutting teeth themselves. As shown in FIG. 1, the blade stops 106 may have a wedge or shim shape in some implementations. In other implementations, the blade stops 106 may have an angled cross-section. As a specific example, in one implementation the blade stops 106 may be composed of segments of angle iron welded to the front surface 112 of the blade body 102, pointing upward. The shape of the blade stop 106 will be discussed in greater detail with respect to FIG. 6, below.

As shown in FIG. 1, the blade stops 106 and tooth mounts 104 may be placed on the blade body 102 in an alternating fashion, with gaps between them. According to various implementations, the space between the stops 106 and mounts 104 may be sized to facilitate the installation and removal of the cutting teeth. For example, in one implementation, the edge surface 116 between a tooth mount 104 and a blade stop 106 may subtend an arc length roughly equal (e.g. within 10%) to the arc length subtended by the tooth mount 104.

Figure 2:
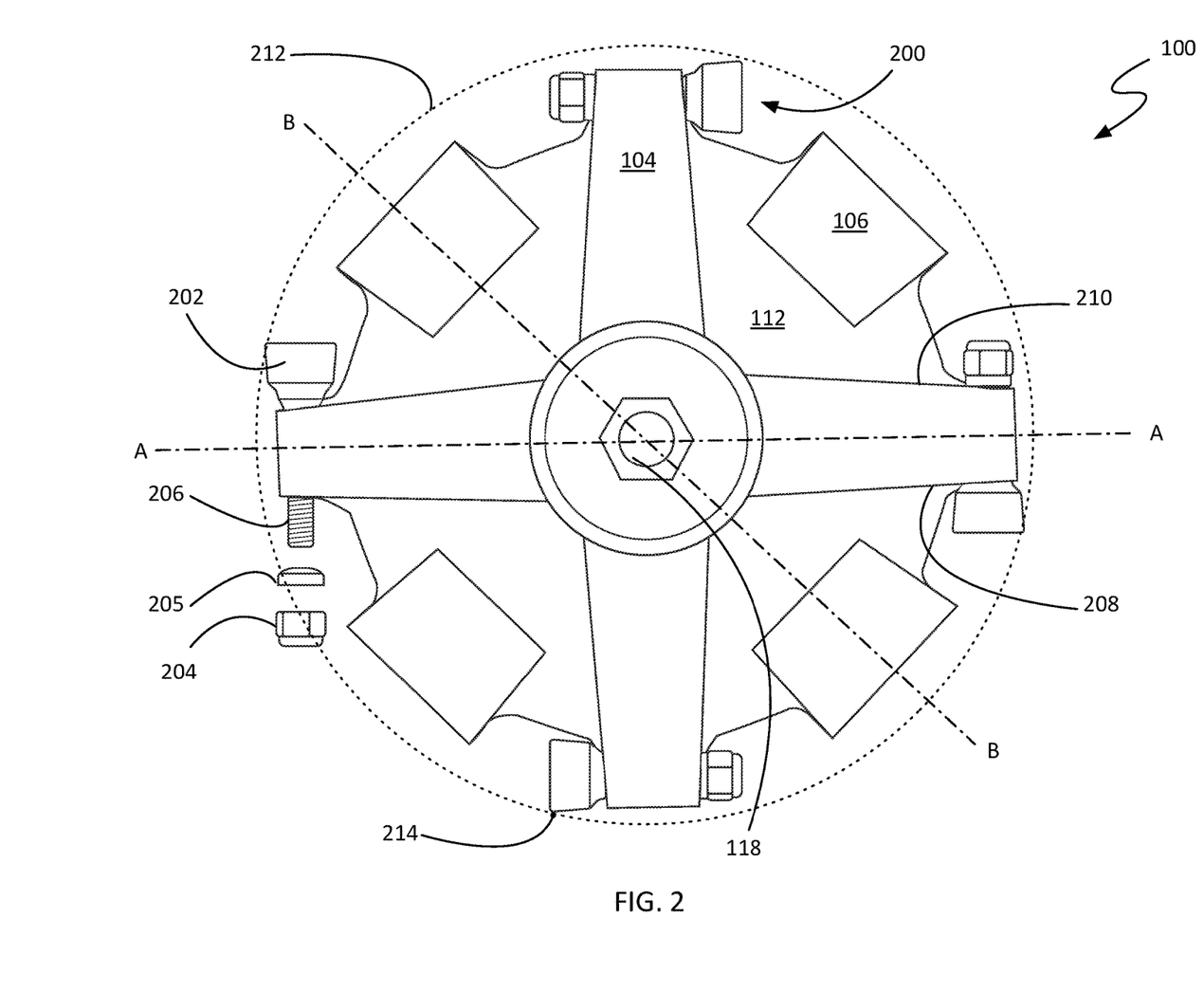
FIG. 2 is a top view of a grinding blade.
Figure 3:
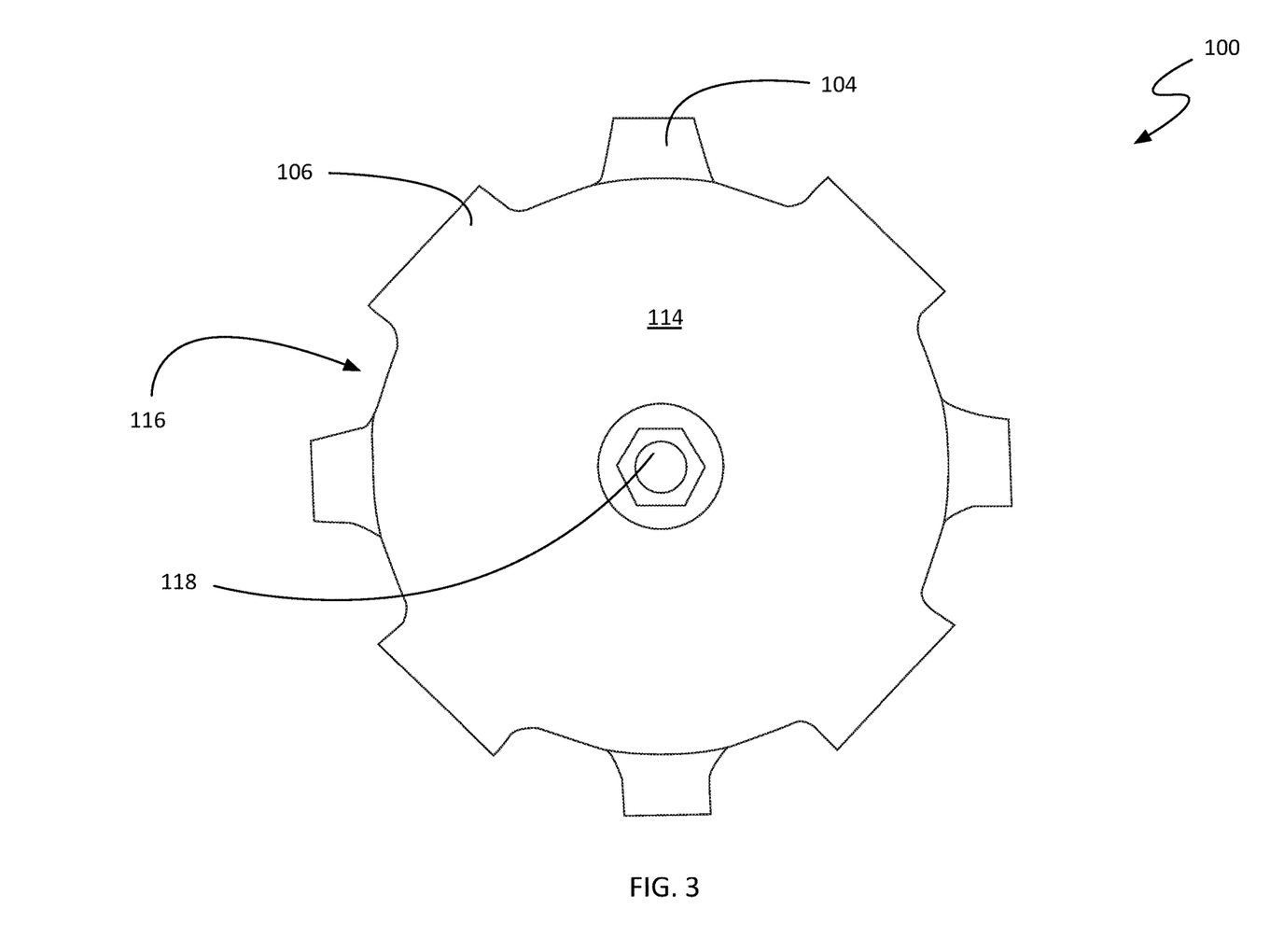
FIG. 3 is a bottom view of a grinding blade.

FIGS. 2 and 3 show top and bottom views of a non-limiting example of a grinding blade 100. FIG. 2 further includes installed cutting teeth 200. For illustrative purposes, one of the cutting teeth 200 is shown exploded. As shown, the blade stops 106 and tooth mounts 104 are distributed about the blade body 102 with radial symmetry with respect to the central axis that passes through the center of the blade mounting hole 118. According to various implementations, the mounts 104 and stops 106 may be distributed about the body 102 with radial symmetry, though not necessarily the same degree of symmetry. As a consequence, the weight is distributed evenly about the central axis 120, allowing for smoother operation.

As shown, the cutting teeth 200 are releasably coupled to the grinding blade 100 through the tooth apertures 108 of the tooth mounts 104. Each cutting tooth 200 comprises a cutting head 202 and a tooth shank 206, which is the stem that connects to the cutting head and passes through the tooth aperture 108 of the tooth mount 104. The tooth shank 206 is configured to releasably couple with a releasable fastener 204 on the end distal to the cutting head 202. The releasable fastener 204 may thread onto the tooth shank 206, as shown in FIG. 2, or may couple with the shank 206 in any other way known in the art. In some implementations, a spacer 205 may be on the tooth shank 206, before the releasable fastener 204. As shown, the cutting teeth 200 all couple with the grinding blade 100 facing in the same rotational direction, with the cutting head 202 always on the leading side 208 of the tooth mounts 104 and the releasable fastener 204 on the trailing side 210 of the tooth mount 104.

The cutting head 202 of the cutting teeth 200 may be circular, as shown, or may take on any other profile shape known in the art. In the non-limiting example shown in FIG. 2, the cutting head 202 is cup shaped, with a cutting edge that runs around the circumference of the head. In other implementations, the cutting head 202 may take on other shapes that have functional cutting edges or surfaces that are shaped and angled to carve out wood, or a particular type of wood. The cutting head 202 may be composed o any suitable tough material capable of withstanding abrasion and impact, such tungsten carbide, and may be formed integral with the tooth shank 206 or affixed to the tooth shank 206 using any method known in the art, including but not limited to welding, brazing, adhesive, or solder.

As previously mentioned, in some implementations, the shape of the cutting teeth 200, combined with a complementary shape of the tooth aperture 108, may serve to prevent the cutting tooth 200 from rotating with respect to the tooth mount 104 once installed. For example, in one implementation, the tooth shank 206 may have a non-circular cross section that mates with a non-circular cross section of the tooth aperture 108. In another implementation, the edge of the tooth aperture 108 may be chamfered in an asymmetrical manner, and mate with the portion of the cutting tooth 200 where the shank 206 meets the cutting head 202. In other implementations, the cutting teeth 200 may be free to rotate within the tooth apertures 108.

In some implementations, the grinding blade 100 may be combined with commercially available cutting teeth 200. As a specific example, in one implementation, the grinding blade 100 may be used with the Green option tooth of the 500 Series Greenteeth® sold by Green Manufacturing, Inc. 9650 Packard Road, Morenci, Mich. 49256. In some implementations, the tooth apertures 108 may be sized larger than standard tooth shanks 206, and may be combined with an adapter sleeve that would allow a variety of cutting teeth to be used with the grinding blade 100, having different shank sizes and cross sections.

In other implementations, the grinding blade 100 may be used with cutting teeth 200 designed specifically for the grinding blade 100. For example, as will be discussed in greater detail with respect to FIG. 7, each blade stop 106 shields a portion of a cutting head 202 from being exposed. In some implementations, the cutting head 202 may be shaped such that a cutting edge only exists in the region that is exposed by the stops 106. Of course, that same blade 100 may also be compatible with conventional cutting teeth, as well.

In the non-limiting example of FIG. 2, the releasable fastener 204 is a threaded nut that screws on to the end of the tooth shank 206. In other implementations, the releasable fastener 204 may be one of a variety of mechanisms, including but not limited to, a spring type external or internal lock ring on the shank portion or aperture cooperating with a corresponding groove, a cross pin extending through the tooth aperture 108 and tooth shank 206, and a threaded fastener inserted into corresponding internal threads in an end of the shank 206.

As shown in FIG. 2, the grinding blade 100 has a maximum blade radius 212, which is the greatest perpendicular distance between the central axis 120 and a point 214 on one of the cutting teeth 200. This represents the largest radius of the blade 212, and may serve to limit the powered tools compatible with the blade 100. For example, in one implementation, the maximum blade radius 212 may be no greater than 4.5 inches, such that the blade may be used with a standard 9 inch angle grinder.

Figure 4:
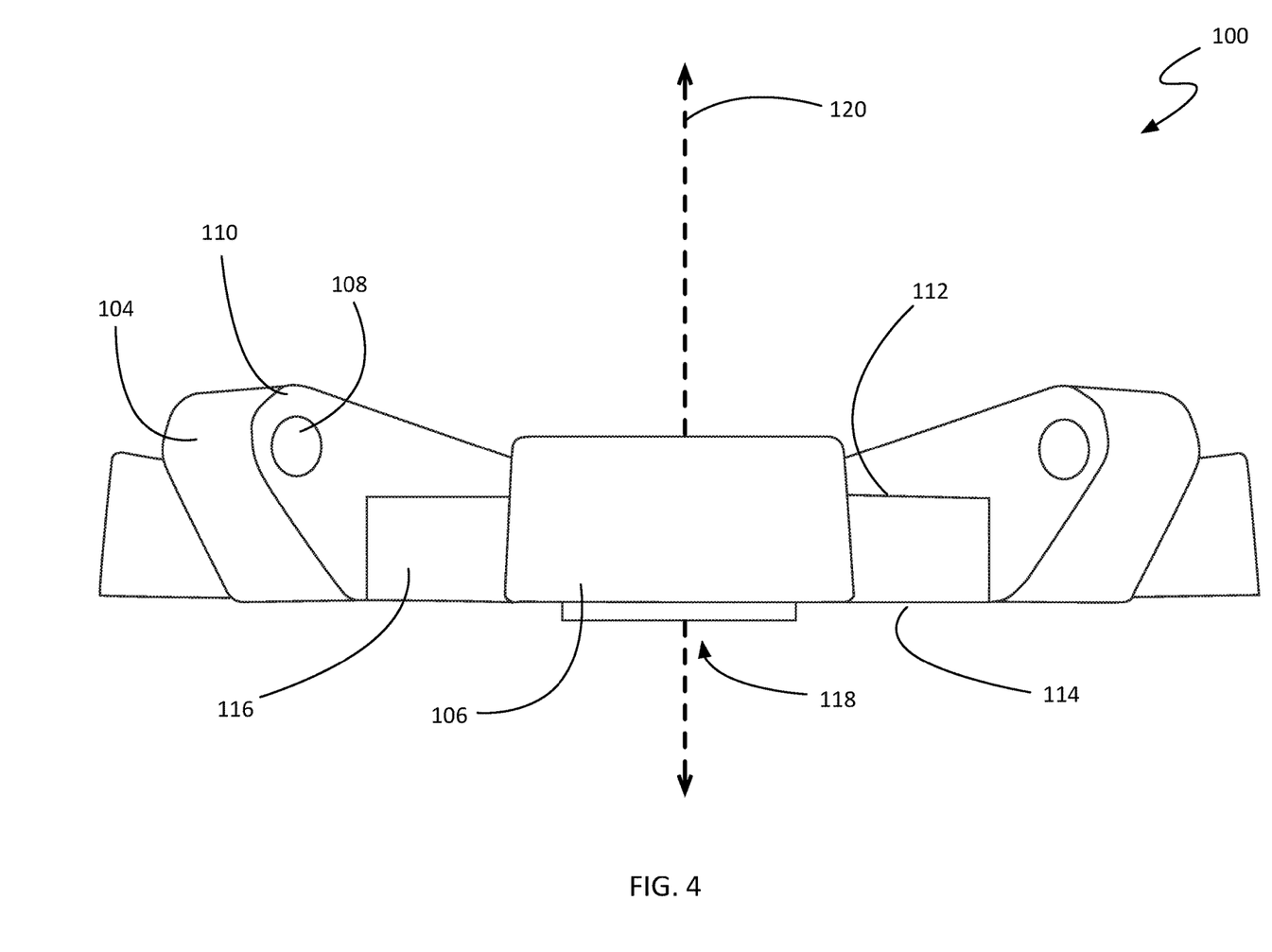
FIG. 4 is a side view of a grinding blade.

FIG. 4 is a side view of a non-limiting example of a grinding blade 100. As shown, a majority of the back surface 114 of the blade body 102 is flat, or planar. The portion proximate the central axis 120 and the blade mounting hole 118 extends outward from the back surface 114 to facilitate use with a powered tool. According to some implementations, a majority of the back surface 114 may be planar, and none of the cutting teeth 200, or more specifically the cutting heads 202, extend below the back surface 114 such that the blade 100 is compatible with a conventional angle grinder. In other implementations, the back surface 114 may be entirely planar, other than a protruding portion surrounding the central axis 120.

Figure 5:
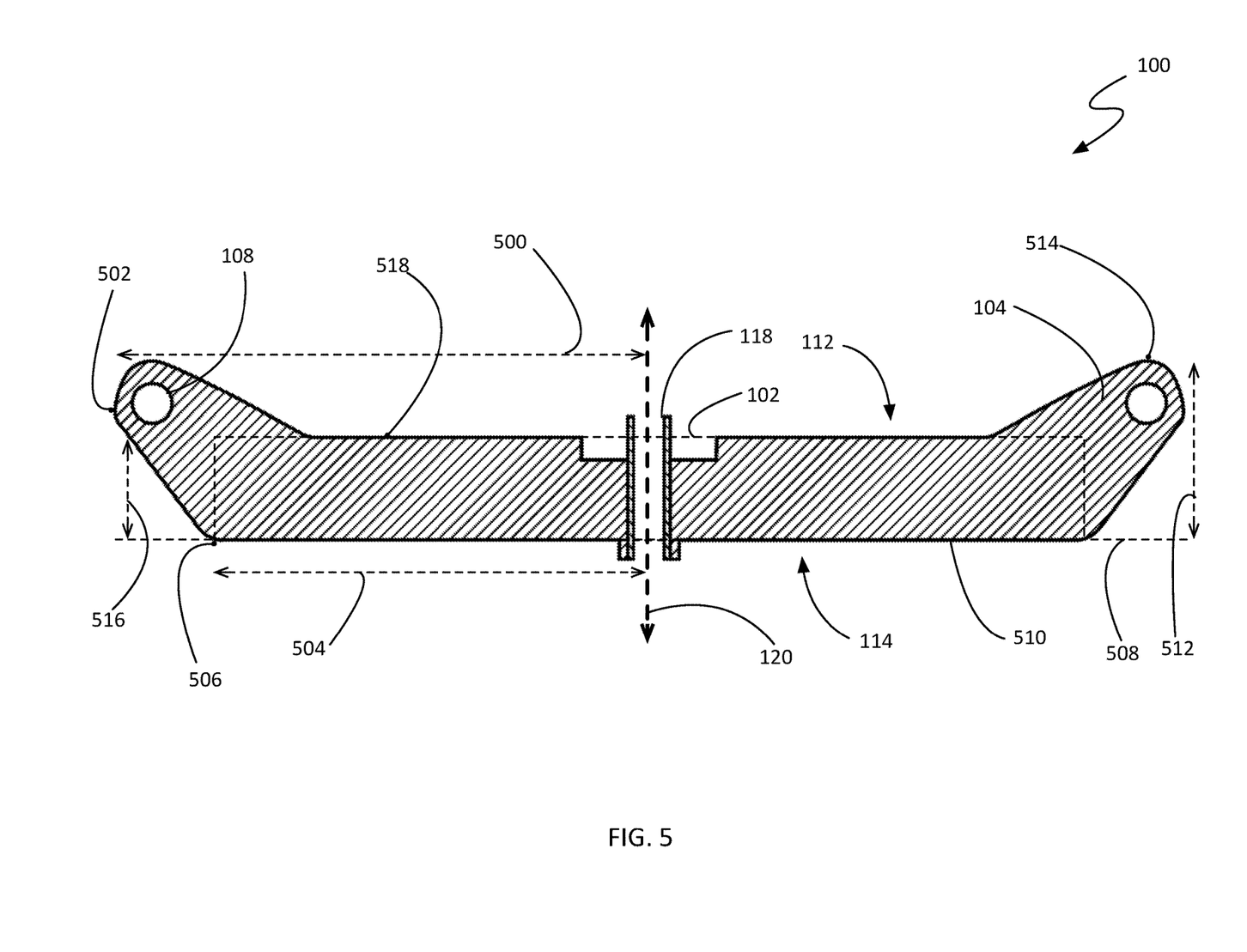
FIG. 5 is a cross sectional view of a grinding blade along line A-A.
Figure 6:
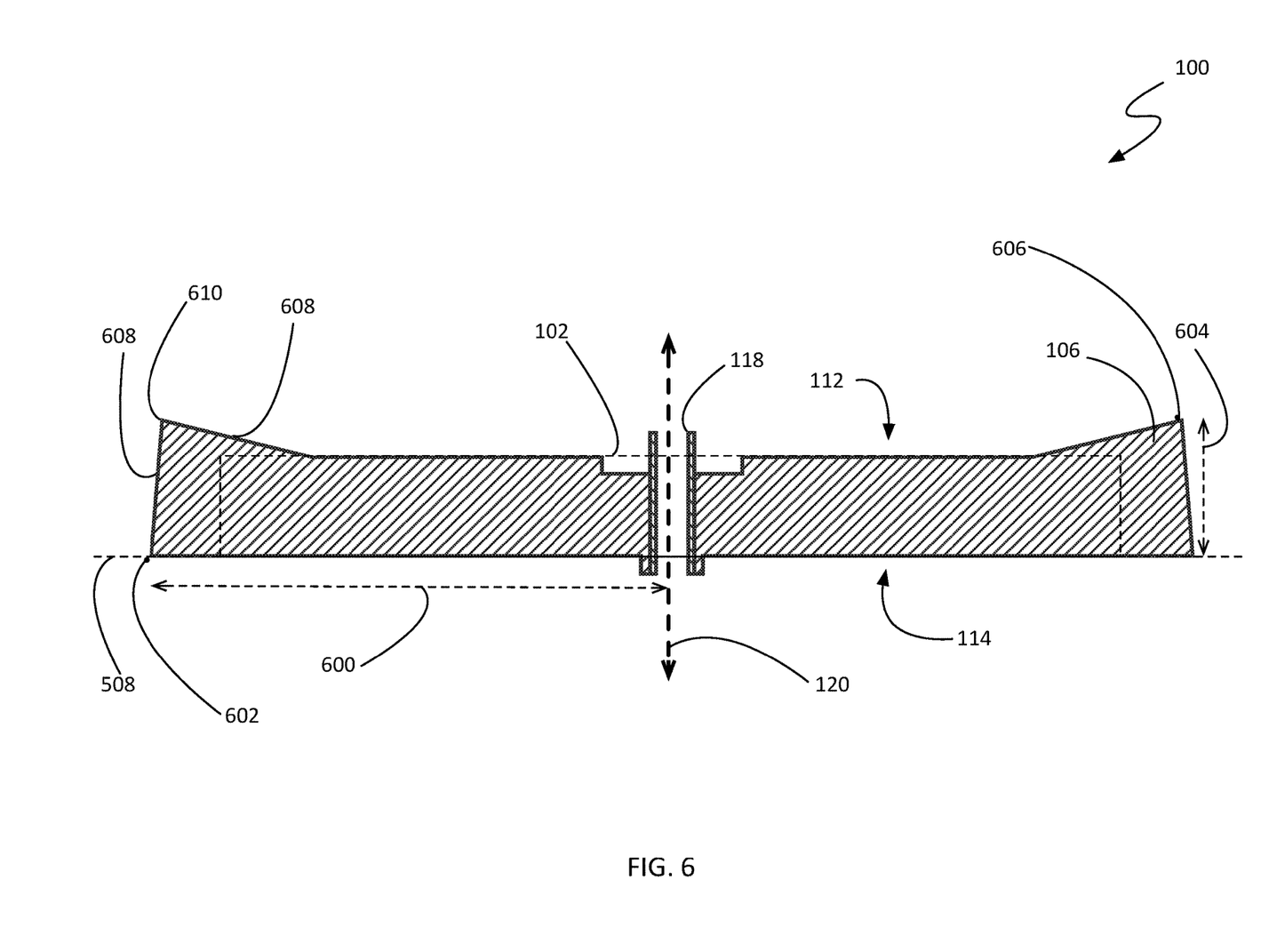
FIG. 6 is a cross sectional view of a grinding blade along line B-B.

FIGS. 5 and 6 are cross sectional views of the non-limiting example of a grinding blade 100 shown in FIG. 2. Specifically, FIG. 5 is the cross section taken along line A-A of FIG. 2, cutting through a tooth mount 104, and FIG. 6 is the cross section taken along line B-B of FIG. 2, cutting through a blade stop 106. According to various implementations, the tooth mounts 104 are shaped such that the cutting heads 202 extend out from the blade 100 and are able to impact and cut the targeted material (e.g. stumps, wood, concrete, etc.), and the stops 106 are shaped such that they shield a portion of the cutting head and prevent the blade 100 from plunging too deep into the material or taking too big a bite. As previously mentioned, the blade stops 106 and the tooth mounts 104 protrude in at least one of upward from the back surface 114 and outward from the central axis 120.

FIGS. 5 and 6 show the protrusions of the tooth mount 104, blade stop 106, relative to the body 102, or more specifically, the edge surface 116. According to various implementations, the limits of the tooth mounts 104, blade stops 106, and body 102 may be defined in relation to each other, and within these physical constraints, a variety of shapes may be employed such that the blade 100 operation is smooth, and the cutting teeth 200 may be installed and removed with ease.

A maximum mount radius 500 is a greatest perpendicular distance between the central axis 120 and a point 502 on one of the plurality of tooth mounts. A maximum stop radius 600 is a greatest perpendicular distance between the central axis 120 and a point 602 on one of the plurality of blade stops 106. A maximum body radius 504 is a greatest perpendicular distance between the central axis 120 and a point 506 on the edge surface 116. According to various implementations, the maximum mount radius 500 is greater than the maximum stop radius 600, and the maximum stop radius 600 is greater than the maximum body radius 504. In these implementations, the mounts 104, stops 106, and body 102 may take on a variety of shapes and structures.

Similarly, elevations may be described with respect to a back plane 508, which is a plane normal to the central axis 120 and containing a majority of the back surface 114 of the blade body 102. A maximum mount elevation 512 is a greatest normal distance between the back plane 508 and a point 514 on one of the plurality of tooth mounts 104, a maximum stop elevation 604 is a greatest normal distance between the back plane 508 and a point 606 on one of the plurality of blade stops 106, and a maximum body elevation 516 is a greatest normal distance between the back plane 508 and a point 518 on the edge surface 116. According to various implementations, the maximum mount elevation 512 is greater than the maximum stop elevation 604, and the maximum stop elevation 604 is greater than the maximum body elevation 516.

As previously mentioned, the blade stops 106 serve to prevent the blade 100 from plunging too deep into the target material or taking too big a bite. According to various implementations, the blade stops 106 may be shaped such that they limit the depth of the blade while not acting as additional cutting teeth. For example, in some implementations, each blade stop 106 may comprise two facial surfaces 608. In the context of the present description and the claims that follow, a facial surface 608 is a surface that faces away from at least one of the back surface 114 and the central axis 120. In these implementations, these two facial surfaces 608 meet along an edge 610, and that edge 610 contains the maximum stop elevation 604, such that each of the two facial surfaces 608 slopes downward from the maximum stop elevation 604. Accordingly, while in use, the first part of the blade stop 104 that would come into contact with the target material as the blade 100 is being pushed in would be the edge 610, or even just a point 610, that tapers outward. Instead of meeting the material in a squared manner, which might make the stop 106 into a cutting edge, it is angled, limiting the depth while minimizing the contact with the target material itself. Other implementations may make use of other stop shapes, including curved surfaces, which may limit blade depth without acting as cutting teeth.

Figure 7:
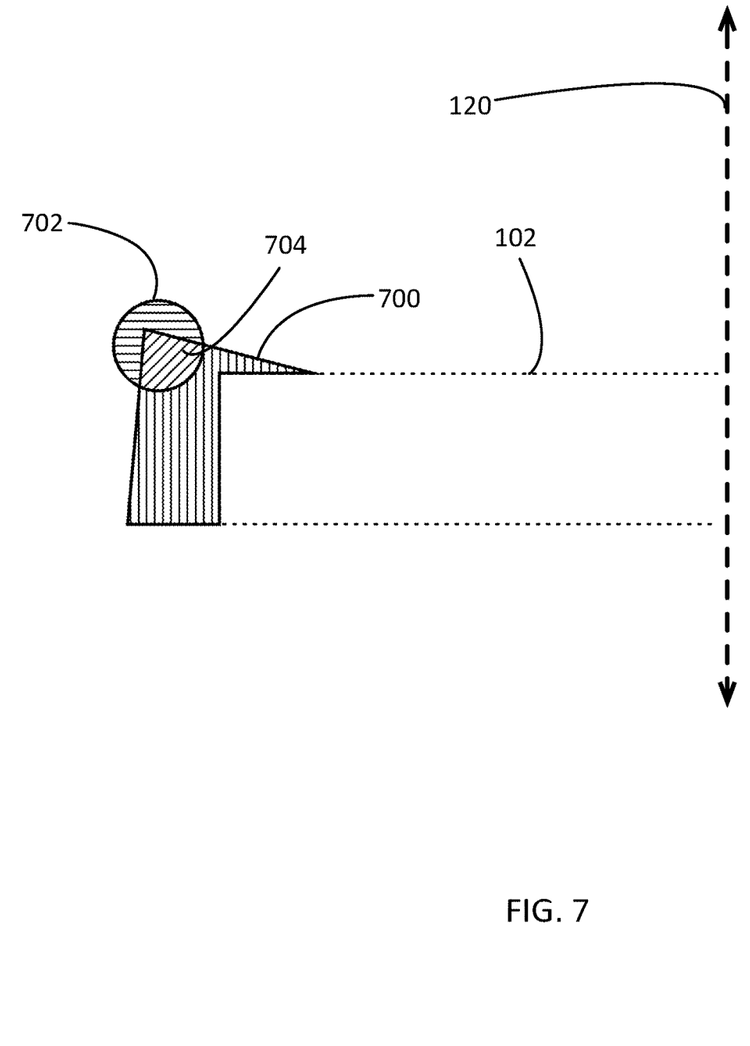
FIG. 7 is a cross sectional view of the solids of rotation of elements of a grinding blade.

FIG. 7 is a cross sectional view of the solids of revolution of a blade stop 106 and a cutting head 202, according to various implementations. In the context of the present description and the claims that follow, a solid of revolution is the three dimensional volume that is carved out by rotating an object or surface all the way around the central axis 120. As previously mentioned, in some implementations, the blade stops 106 serve to shield a portion of the cutting head 202 from exposure to the target material, to prevent too big a bite from being taken and to facilitate the smooth operation of the blade 100. Such shielding may best be described with respect to the radial cross sections of the solids of rotation of the cutting heads 202 (or the functional surface of the cutting head that defines cutting edges) and blade stops 106.

As shown, the cross section 700 of the solid of revolution defined by rotation the blade stop 106 about the central axis 120 (i.e. the section filled with diagonal and vertical lines in FIG. 7) overlaps 704 (i.e. the section filled with diagonal lines in FIG. 7) with the cross section 702 of the solid of revolution defined by the rotation of the cutting head 202 about the central axis 120 (i.e. the section filled with diagonal and horizontal lines in FIG. 7). In some implementations, the overlap 704 may cover a majority of the cross section 702 of the rotated cutting head 202. In other implementations, the overlap 704 may be two thirds of the cross section 702, while in other implementations the overlap 704 may be less than a majority of the cross section 702. The user may wish to modify the amount of overlap 704, or in other words, modify the "bite size" (e.g. working on softer materials may allow for larger bites to be taken without increasing the danger, etc.), and may do so by using cutting teeth 200 having cutting heads 202 that are larger or smaller.

Figure 8:
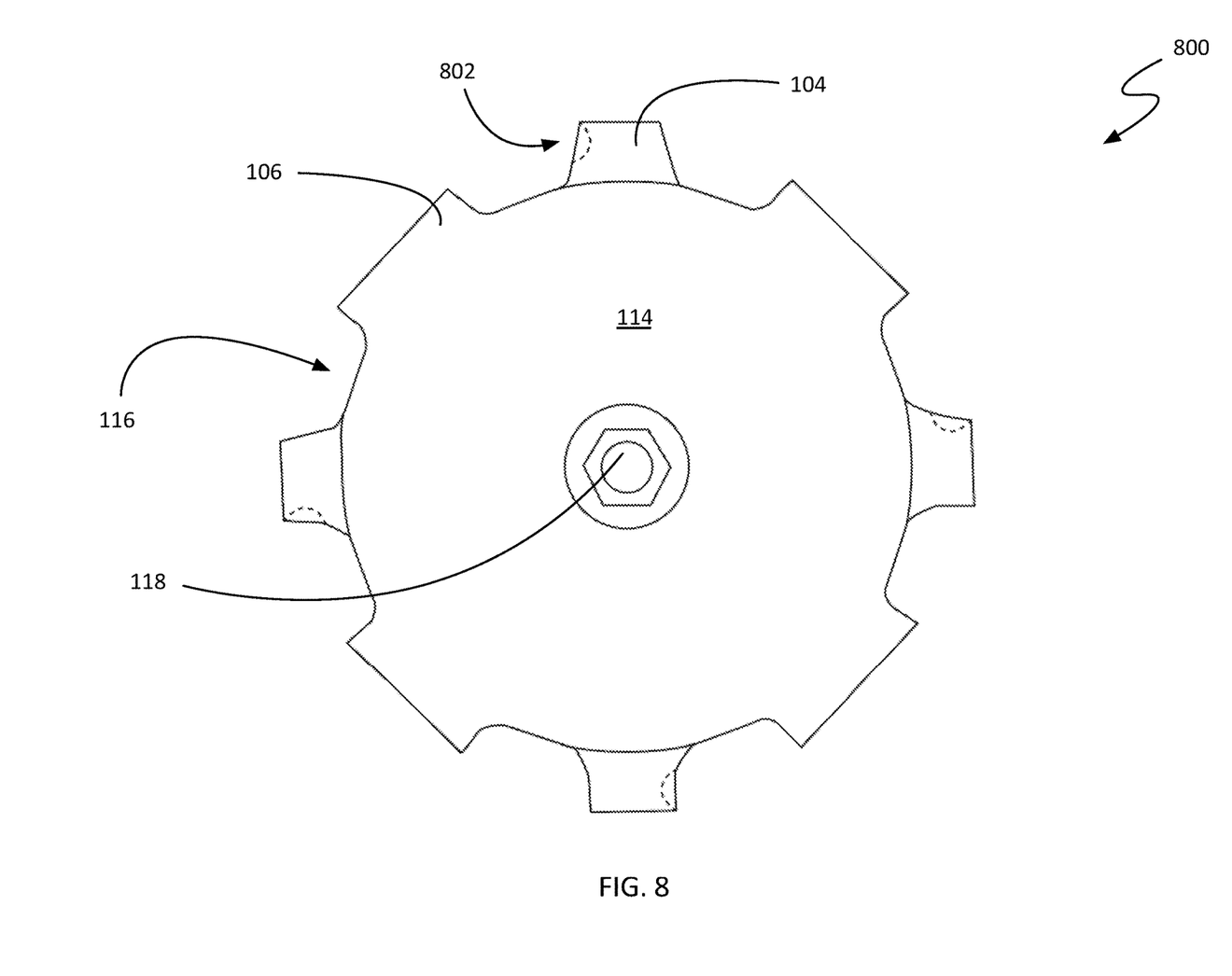
FIG. 8 is a bottom view of a grinding blade having integral cutting teeth.
Figure 9:
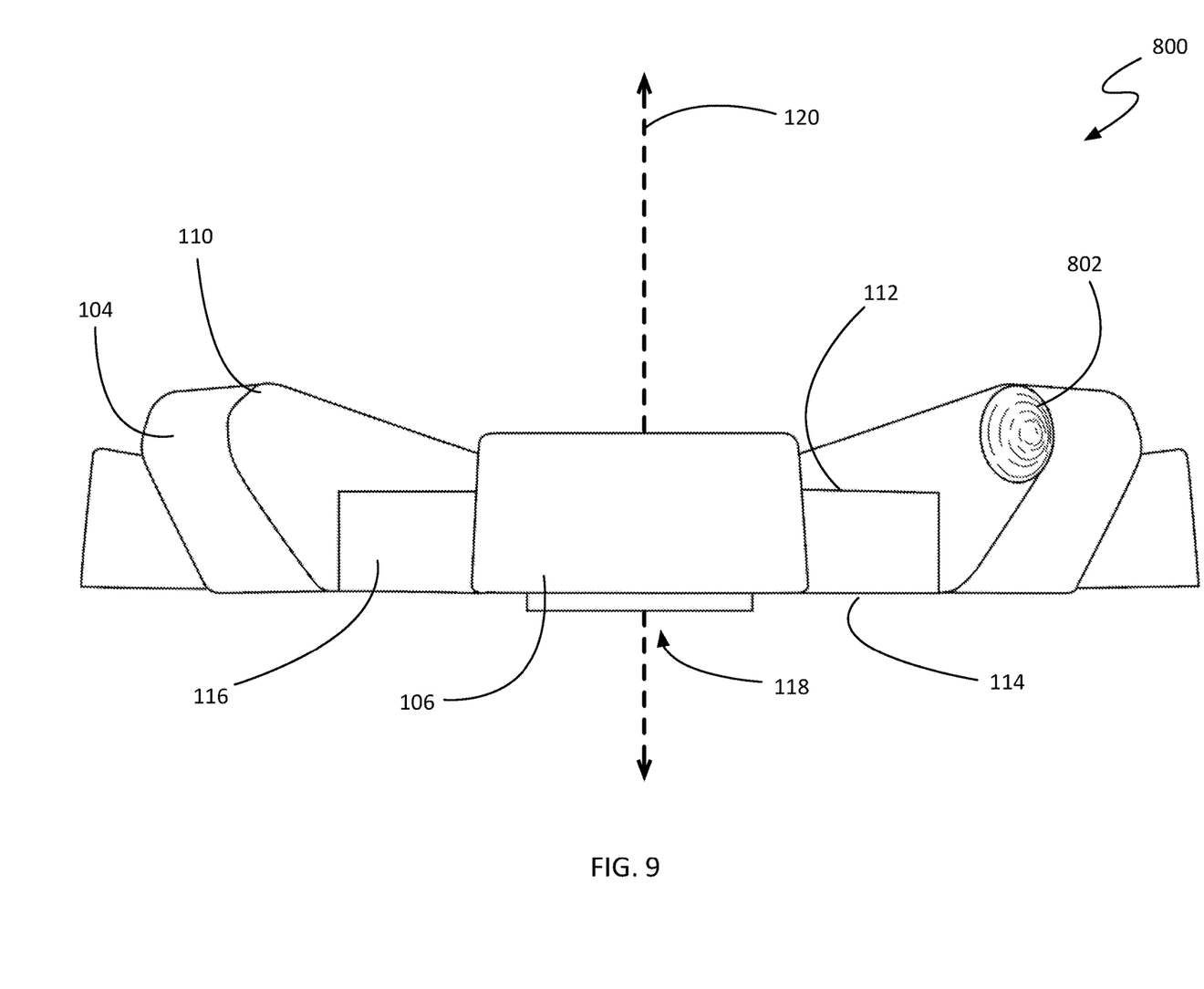
FIG. 9 is a side view of a grinding blade having integral cutting teeth.

FIGS. 8 and 9 show a non-limiting example of an implementation of a grinding blade 800 having integral cutting heads 802. As shown, the tooth mounts 104 each comprise a cutting head 800 that is formed integral with the mount 104. In another implementation, each integral cutting head 800 may also comprise a tooth aperture 108, allowing the blade to be used with conventional, removable cutting teeth, as well as the integral cutting heads 800. This may be advantageous, as the integral cutting heads may be designed for use with softer materials, but the same blade could be used on much tougher material with the installation of cutting teeth designed for such use.

The grinding blades contemplated herein, and the component parts such as the body 102, tooth mounts 104, cutting teeth 200, and blade stops 106, may be composed of any materials known in the art to be able to withstand the strain of high speed rotation and impact with hard substances. These materials may include, but are not limited to, aluminum, steel, and other alloys.

As previously mentioned, the grinding blade 100 may have a variety of dimensions, to be compatible with various powered tools. In one specific exemplary implementation, the blade 100 may comprise a blade body 102 that is flat, circular, ⅛" thick and having a 7" diameter. On the front surface 112 of the body 102 are affixed four tooth holders 104 whose apertures 108 are ½" long segments of pipe having a ¼" inner diameter. Also affixed to the front surface 112 are four blade stops 106, made of 2⅜" segments of ½" angle iron with the vertex pointing upward.

In another specific example, the blade 100 may comprise a circular blade body 102 that is ½" thick, having a 7.5" diameter. Extending upward and outward from the front surface 112 and edge surfaces 116 are four tooth mounts 104 and four blade stops 106. The tooth mounts 104 are ⅞" wide at the distal end 110, and 1⅛" high at the maximum mount elevation 512. The blade stops are 1¾" wide at their distal end, and ⅞" high at their maximum stop elevation 604. The maximum body radius 504 is 3.125", the maximum stop radius 600 is 3.5" and the maximum mount radius 500 is 3.75".

Where the above examples, implementations and implementations reference examples, it should be understood by those of ordinary skill in the art that other grinding blades and examples could be intermixed or substituted with those provided. In places where the description above refers to particular implementations of grinding blades, it should be readily apparent that a number of modifications may be made without departing from the spirit thereof and that these implementations and implementations may be applied to other grinding blades as well. Accordingly, the disclosed subject matter is intended to embrace all such alterations, modifications and variations that fall within the spirit and scope of the disclosure and the knowledge of one of ordinary skill in the art.

What is claimed is:

1. A grinding blade, comprising:
   a blade body comprising a front surface, a back surface opposite and below the front surface, and a blade mounting hole passing through the front surface and the back surface along a central axis, and further comprising an edge surface distal to the central axis, the edge surface joining the front surface and the back surface, the blade mounting hole sized and shaped for mounting to a powered tool;
   a plurality of tooth mounts integral with the blade body and protruding upward and away from the back surface and away from the central axis, each tooth mount of the plurality of tooth mounts comprising a tooth aperture proximate a distal end of the tooth mount and substantially perpendicular to the central axis;
   a plurality of blade stops integral with the blade body and protruding upward and away from the back surface and away from the central axis, the blade stops and tooth mounts being equal in number and distributed in alternating fashion proximate the edge surface such that the plurality of tooth mounts has radial symmetry with respect to the central axis and the plurality of blade stops has radial symmetry with respect to the central axis; and
   a plurality of cutting teeth, each cutting tooth of the plurality of cutting teeth releasably coupled to the tooth aperture of a different tooth mount of the plurality of tooth mounts and comprising a cutting head on a leading side of the tooth mount, and a releasable fastener on a trailing side of the tooth mount, the releasable fastener coupled to the cutting head by a tooth shank integral with the cutting head and passing through the tooth aperture;
   wherein a maximum mount radius is a greatest perpendicular distance between the central axis and a point on one of the plurality of tooth mounts measured perpendicular to the central axis, a maximum stop radius is a greatest perpendicular distance between the central axis and a point on one of the plurality of blade stops measured perpendicular to the central axis, and a maximum body radius is a greatest perpendicular distance between the central axis and a point on the edge surface measured perpendicular to the central axis;
   wherein the maximum mount radius is greater than the maximum stop radius, and the maximum stop radius is greater than the maximum body radius;
   wherein a back plane is a plane normal to the central axis and containing a majority of the back surface of the blade body;
   wherein a maximum mount elevation is a greatest normal distance between the back plane and a point on one of the plurality of tooth mounts measured normal to the back plane, a maximum stop elevation is a greatest normal distance between the back plane and a point on one of the plurality of blade stops measured normal to the back plane, and a maximum body elevation is a greatest normal distance between the back plane and a point on the edge surface measured normal to the back plane;
   wherein the maximum mount elevation is greater than the maximum stop elevation, and the maximum stop elevation is greater than the maximum body elevation; and
   wherein a cross section of a solid of revolution defined by rotating the plurality of blade stops about the central axis overlaps with at least two thirds of a cross section of a solid of revolution defined by rotating the cutting heads of the plurality of cutting teeth about the central axis.

2. The grinding blade of claim 1, wherein a maximum blade radius is a greatest perpendicular distance between the central axis and a point on one of the plurality of teeth measured perpendicular to the central axis, and is no greater than 4.5 inches.

3. The grinding blade of claim 1, wherein each blade stop of the plurality of blade stops comprises two facial surfaces each facing away from at least one of the back surface and the central axis, and wherein the maximum stop elevation occurs on at least a location on each blade stop of the plurality of blade stops, the location being on an edge formed by an intersection of the two facial surfaces, wherein each of the two facial surfaces slopes downward from the location.

4. The grinding blade of claim 1, wherein the plurality of cutting teeth are all entirely above the back surface.

5. The grinding blade of claim 1, wherein the plurality of blade stops is four blade stops, and the plurality of tooth mounts is four tooth mounts.

6. A grinding blade, comprising:
   a blade body comprising a front surface, a back surface opposite and below the front surface, and a blade mounting hole passing through the front surface and the back surface along a central axis, and further comprising an edge surface distal to the central axis, the edge surface joining the front surface and the back surface, the blade mounting hole sized and shaped for mounting to a powered tool;
   a plurality of tooth mounts integral with and protruding from the blade body, each tooth mount of the plurality of tooth mounts comprising a tooth aperture proximate a distal end of the tooth mount and substantially perpendicular to the central axis;
   a plurality of blade stops integral with and protruding from the blade body, the blade stops and tooth mounts being equal in number and distributed in alternating fashion proximate the edge surface such that the plurality of tooth mounts has radial symmetry with respect to the central axis and the plurality of blade stops has radial symmetry with respect to the central axis; and
   a plurality of cutting teeth, each cutting tooth of the plurality of cutting teeth releasably coupled to the tooth aperture of a different tooth mount of the plurality of tooth mounts and comprising a cutting head on a leading side of the tooth mount, and a releasable fastener on a trailing side of the tooth mount, the releasable fastener coupled to the cutting head by a tooth shank integral with the cutting head and passing through the tooth aperture;

wherein the plurality of blade stops and the plurality of tooth mounts are all at least one of protruding upward and away from the back surface and protruding outward and away from the central axis, and wherein the blade stops and tooth mounts are equal in number and distributed evenly and in alternating fashion proximate the edge surface;

wherein a maximum mount radius is a greatest perpendicular distance between the central axis and a point on one of the plurality of tooth mounts measured perpendicular to the central axis, a maximum stop radius is a greatest perpendicular distance between the central axis and a point on one of the plurality of blade stops measured perpendicular to the central axis, and a maximum body radius is a greatest perpendicular distance between the central axis and a point on the edge surface measured perpendicular to the central axis; and wherein the maximum mount radius is greater than the maximum stop radius, and the maximum stop radius is greater than the maximum body radius.

7. The grinding blade of claim 6, wherein a cross section of a solid of revolution defined by rotating the plurality of blade stops about the central axis overlaps with at least a majority of a cross section of a solid of revolution defined by rotating the cutting heads of the plurality of cutting teeth about the central axis.

8. The grinding blade of claim 6, wherein a maximum blade radius is a greatest perpendicular distance between the central axis and a point on one of the plurality of teeth measured perpendicular to the central axis, and is no greater than 4.5 inches.

9. The grinding blade of claim 6:

wherein a back plane is a plane normal to the central axis and containing a majority of the back surface of the blade body;

wherein a maximum mount elevation is a greatest normal distance between the back plane and a point on one of the plurality of tooth mounts measured normal to the back plane, a maximum stop elevation is a greatest normal distance between the back plane and a point on one of the plurality of blade stops measured normal to the back plane, and a maximum body elevation is a greatest normal distance between the back plane and a point on the edge surface measured normal to the back plane; and wherein the maximum mount elevation is greater than the maximum stop elevation, and the maximum stop elevation is greater than the maximum body elevation.

10. The grinding blade of claim 9, wherein each blade stop of the plurality of blade stops comprises two facial surfaces each facing away from at least one of the back surface and the central axis, and wherein the maximum stop elevation occurs on at least a location on each blade stop of the plurality of blade stops, the location being on an edge formed by an intersection of the two facial surfaces, wherein each of the two facial surfaces slopes downward from the location.

11. The grinding blade of claim 6, wherein a majority of the back surface of the blade body is planar, and wherein the plurality of cutting teeth are all entirely above the back surface.

12. A grinding blade, comprising:

a blade body comprising a front surface, a back surface opposite and below the front surface, a blade mounting hole passing through the front surface and the back surface along a central axis, and an edge surface distal to the central axis, the edge surface joining the front surface and the back surface, the blade mounting hole sized and shaped for mounting to a powered tool;

a plurality of tooth mounts integral with the blade body and at least one of protruding upward and away from the back surface and protruding away from the central axis, each tooth mount of the plurality of tooth mounts comprising a tooth aperture proximate a distal end of the tooth mount and substantially perpendicular to the central axis; and a plurality of blade stops integral with the blade body and at least one of protruding upward and away from the back surface and protruding away from the central axis, the blade stops and tooth mounts being equal in number and distributed evenly and in alternating fashion proximate the edge surface;

wherein a maximum mount radius is a greatest perpendicular distance between the central axis and a point on one of the plurality of tooth mounts measured perpendicular to the central axis, a maximum stop radius is a greatest perpendicular distance between the central axis and a point on one of the plurality of blade stops measured perpendicular to the central axis, and a maximum body radius is a greatest perpendicular distance between the central axis and a point on the edge surface measured perpendicular to the central axis; and wherein the maximum mount radius is greater than the maximum stop radius, and the maximum stop radius is greater than the maximum body radius.

13. The grinding blade of claim 12:

wherein a back plane is a plane normal to the central axis and containing a majority of the back surface of the blade body;

wherein a maximum mount elevation is a greatest normal distance between the back plane and a point on one of the plurality of tooth mounts measured normal to the back plane, a maximum stop elevation is a greatest normal distance between the back plane and a point on one of the plurality of blade stops measured normal to the back plane, and a maximum body elevation is a greatest normal distance between the back plane and a point on the edge surface measured normal to the back plane; and wherein the maximum mount elevation is greater than the maximum stop elevation, and the maximum stop elevation is greater than the maximum body elevation.

14. The grinding blade of claim 12, further comprising a plurality of cutting teeth, each cutting tooth of the plurality of cutting teeth releasably coupled to the tooth aperture of a different tooth mount of the plurality of tooth mounts and comprising a cutting head on a leading side of the tooth mount, and a releasable fastener on a trailing side of the tooth mount, the releasable fastener coupled to the cutting head by a tooth shank integral with the cutting head and passing through the tooth aperture.

15. The grinding blade of claim 14, wherein a cross section of a solid of revolution defined by rotating the plurality of blade stops about the central axis overlaps with at least a majority of a cross section of a solid of revolution defined by rotating the cutting heads of the plurality of cutting teeth about the central axis.

16. The grinding blade of claim 14, wherein a majority of the back surface of the blade body is planar, and wherein the plurality of cutting teeth are all entirely above the back surface.

17. The grinding blade of claim 12, wherein the plurality of tooth mounts has radial symmetry with respect to the central axis and the plurality of blade stops has radial symmetry with respect to the central axis.

18. The grinding blade of claim 12, wherein the plurality of blade stops is four blade stops, and the plurality of tooth mounts is four tooth mounts.

* * * * *